United States Patent
Liu et al.

(10) Patent No.: US 9,564,659 B2
(45) Date of Patent: *Feb. 7, 2017

(54) POSITIVE ELECTRODE FOR SULFUR-BASED BATTERIES

(71) Applicant: GM GLOBAL TECHNOLOGY OPERATIONS LLC, Detroit, MI (US)

(72) Inventors: Zhongyi Liu, Troy, MI (US); Qiangfeng Xiao, Troy, MI (US); Mei Cai, Bloomfield Hills, MI (US); Michael K. Carpenter, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 126 days.

This patent is subject to a terminal disclaimer.

(21) Appl. No.: 14/555,026

(22) Filed: Nov. 26, 2014

(65) Prior Publication Data

US 2016/0149218 A1    May 26, 2016

(51) Int. Cl.
| | | |
|---|---|---|
| *H01M 4/62* | (2006.01) | |
| *H01M 10/0568* | (2010.01) | |
| *H01M 2/14* | (2006.01) | |
| *H01M 10/0569* | (2010.01) | |
| *H01M 4/38* | (2006.01) | |
| *H01M 10/052* | (2010.01) | |
| *H01M 4/36* | (2006.01) | |
| *H01M 4/58* | (2010.01) | |

(52) U.S. Cl.
CPC ........ *H01M 10/0569* (2013.01); *H01M 4/364* (2013.01); *H01M 4/38* (2013.01); *H01M 4/5815* (2013.01); *H01M 4/62* (2013.01); *H01M 4/621* (2013.01); *H01M 4/624* (2013.01); *H01M 10/052* (2013.01)

(58) Field of Classification Search
CPC  H01M 10/052; H01M 10/0569; H01M 4/364; H01M 4/38; H01M 4/5815; H01M 4/62; H01M 4/621; H01M 4/624; H01M 4/136; H01M 4/1397; H01M 4/58

See application file for complete search history.

(56) References Cited

U.S. PATENT DOCUMENTS

| | | |
|---|---|---|
| 8,450,014 B2 | 5/2013 | Liu et al. |
| 2012/0207994 A1 | 8/2012 | Wang et al. |

FOREIGN PATENT DOCUMENTS

CN          104143630 A   * 11/2014

* cited by examiner

*Primary Examiner* — Carlos Barcena
(74) *Attorney, Agent, or Firm* — Dierker & Kavanaugh, P.C.

(57) ABSTRACT

A positive electrode includes a sulfur-based active material, a binder, a conductive filler, and porous, one-dimensional metal oxide nanorods. The one-dimensional metal oxide nanorods are mixed, as an additive, throughout the positive electrode with the sulfur-based active material, the binder, and the conductive filler. The positive electrode with the porous, one-dimensional metal oxide nanorods may be incorporated into any sulfur-based battery.

20 Claims, 7 Drawing Sheets

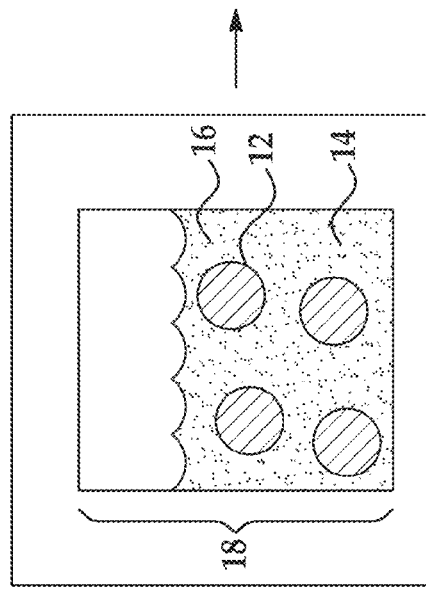
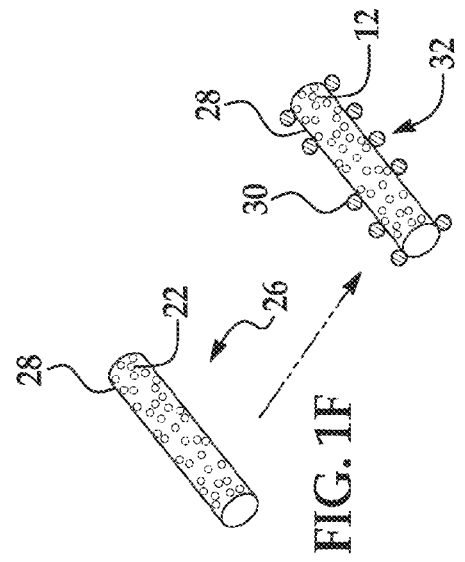
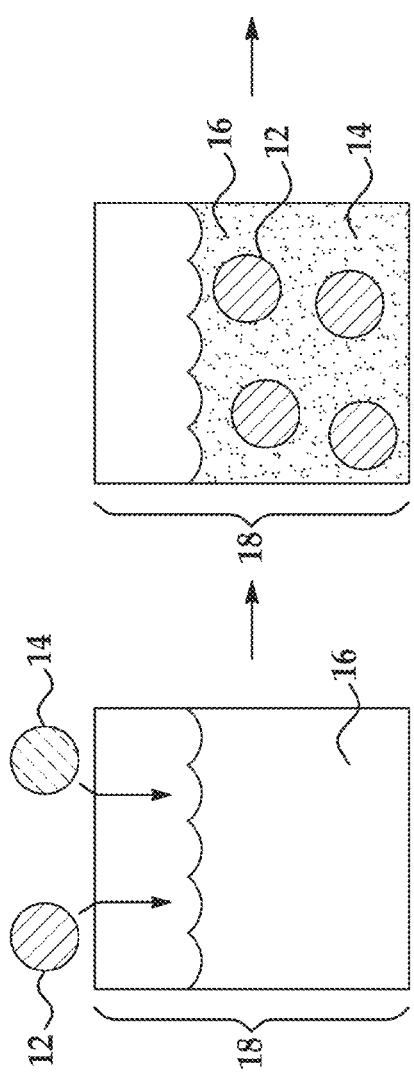
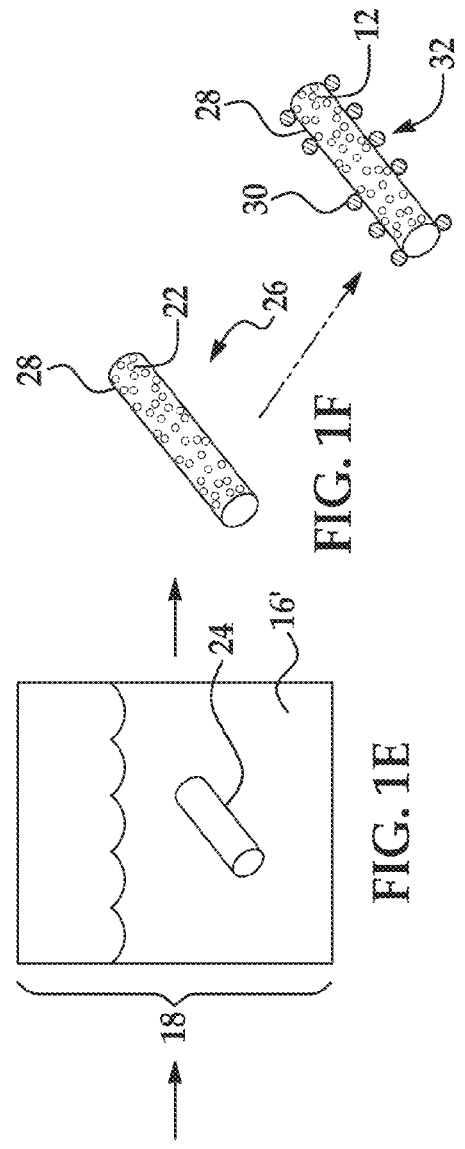

POSITIVE ELECTRODE FOR SULFUR-BASED BATTERIES

BACKGROUND

Secondary, or rechargeable, lithium-sulfur batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

A positive electrode includes a sulfur-based active material, a binder, a conductive filler, and porous, one-dimensional metal oxide nanorods. The one-dimensional metal oxide nanorods are mixed, as an additive, throughout the positive electrode with the sulfur-based active material, the binder, and the conductive filler.

Examples of the positive electrode disclosed herein may be included in a sulfur-based battery.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 1A-1G are schematic and partially cross-sectional diagrams which together illustrate an example of the method for forming an example of the one-dimensional metal oxide nanorods disclosed herein;

DETAILED DESCRIPTION

Figure 2:
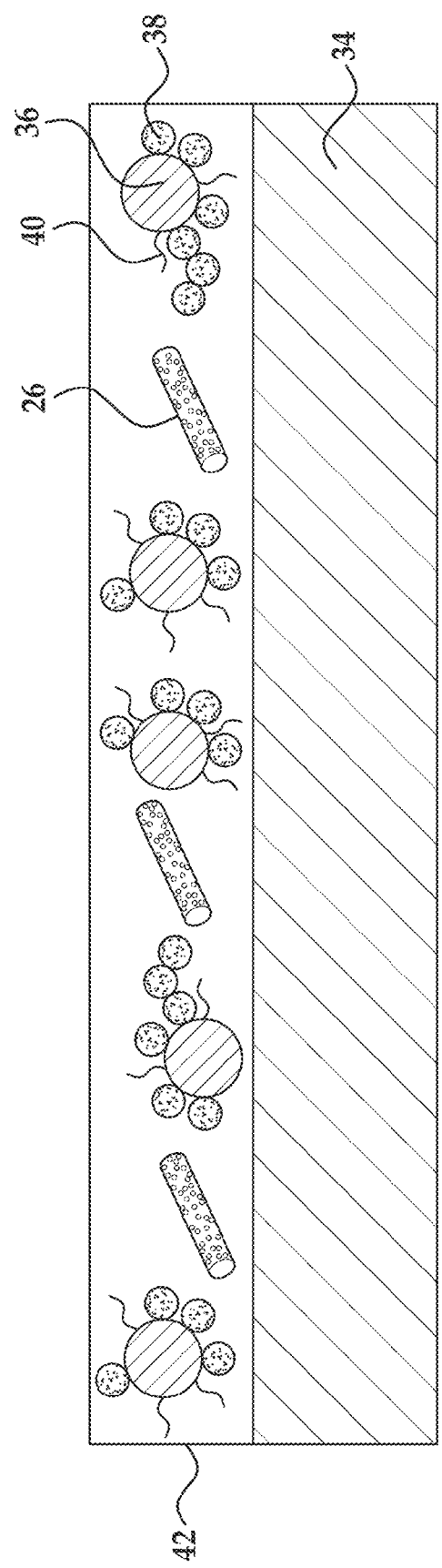
FIG. 2 is a cross-sectional view of an example of a positive electrode on a current collector.

The life cycle of sulfur-based batteries may be limited by the migration, diffusion, or shuttling of lithium-polysulfide intermediates ($LiS_x$, where x is 2<x<8) from the positive electrode through the porous polymer separator, to the negative electrode during the battery discharge process. The lithium-polysulfide intermediates generated at the sulfur-based positive electrode are soluble in the electrolyte, and can migrate to the negative electrode where they react with the negative electrode in a parasitic fashion to generate lower-order lithium-polysulfide intermediates. These lower-order lithium-polysulfide intermediates diffuse back to the positive electrode and regenerate the higher forms of lithium-polysulfide intermediates. As a result, a shuttle effect takes place. This effect leads to decreased sulfur utilization, self-discharge, poor cycleability, and reduced coulombic efficiency of the battery. Without being bound to any theory, it is believed that even a small amount of the lithium-polysulfide intermediate forms an insoluble final product, such as dilithium sulfide ($Li_2S$), that can permanently bond to the negative electrode. This may lead to parasitic loss of active lithium at the negative electrode, which prevents reversible electrode operation and reduces the useful life of the lithium-sulfur battery.

As noted above, the shuttle effect leads to decreased sulfur utilization. This is due to the fact that when the lithium-polysulfide intermediates are formed, the sulfur in the positive electrode is depleted. A reduced amount of sulfur in the positive electrode means that there is less sulfur available for use. The depletion of sulfur also contributes to the limited life cycle of sulfur-based batteries. It is to be understood that the lithium-polysulfide intermediates are referred to herein as polysulfides.

In the positive electrode disclosed herein, porous, one-dimensional metal oxide nanorods are added as an additive. As used herein, the term "one-dimensional" means that the nanorod has a length (which may be from ten(s) of nanometers up to several microns) that is much greater than its diameter (which ranges from 20 nm to 300 nm). Other structures that may be considered one-dimensional include nanowires, nanotubes, and nanofibers. The additive is mixed throughout the positive electrode with the active material, binder, and conductive filler. The porous, one-dimensional metal oxide nanorods act as soluble polysulfide reservoirs. More particularly, the soluble polysulfides that form in the positive electrode become trapped in the pores of the porous, one-dimensional metal oxide nanorods. Since the polysulfides are trapped in the positive electrode, the polysulfides are unable to migrate to the negative electrode and to react with the active material in the negative electrode. As a result, the porous, one-dimensional metal oxide nanorods can mitigate the shuttle effect and can increase the amount of sulfur for utilization in the positive electrode, and in turn, can improve the efficiency, life cycle, and self-discharge of sulfur-based batteries.

In some examples, polysulfides may be trapped in the porous, one-dimensional metal oxide nanorods via physical absorption. In other examples, polysulfides can also be chemically bonded to certain metal oxide nanorods, such as $Al_2O_3$, which acts as a Lewis acid to react with basic polysulfides.

Referring now to FIGS. 1A-1G, an example of the method for forming porous, one-dimensional metal oxide nanorods will be discussed. In an example, the method involves, in part, hydrothermal synthesis to form the porous, one-dimensional metal oxide nanorods.

In reference to FIG. 1A, an aqueous mixture 16 is formed by mixing deionized water, a metal oxide starting material 12 and, in some instances, a pH adjuster 14, in a container 18.

It is to be understood that the metal oxide starting materials 12 are nanoparticles (i.e., particles having an average diameter ranging from about 1 nm to about 100 nm). Some examples of the metal oxide starting material 12 are $TiO_2$, $ZrO_2$, $AlCl_3$, $Si(OH)_4$, or combinations thereof. The selection of the metal oxide starting material 12 will depend upon which type of metal oxide is desirable for the resulting nanorods.

The pH adjuster 14 is also included in the aqueous mixture 16. The pH adjuster 14 changes the pH of the aqueous mixture 16 to a pH ranging from about 7 to about 10 (basic) or from a pH ranging from about 5 to about 7 (acidic). The starting metal oxide material 12 may be used to determine which pH range the pH is adjusted to be within. In an example, if the metal oxide starting material 12 is $TiO_2$, $AlCl_3$, $Si(OH)_4$, or $ZrO_2$ the pH adjuster 14 is included in the aqueous mixture 16. Some examples of the pH adjuster 14 include sodium hydroxide (NaOH), potassium hydroxide (KOH), ammonium hydroxide ($NH_4OH$), or some other base that is suitable for adjusting the pH to the desired level. The pH adjuster 14 not only adjusts the pH of the aqueous mixture 16, but also reacts with the metal oxide starting material 12 during hydrothermal synthesis. The reaction between the pH adjuster 14 and the metal oxide starting material 12 is discussed in reference to FIGS. 1C-1D below.

In an example, when $AlCl_3$ is used as the metal oxide starting material 12, it is desirable that the pH of the final aqueous mixture 16 range from about 5 to about 7 (acidic) or from about 7-9 (basic). In this example, the pH adjuster 14 is used, in part, because the starting metal oxide material 12 is very acidic. For example, the aqueous mixture 16 has a pH of about 2.6 when $AlCl_3$ alone is added into deionized water. As such, the pH adjuster 14 is added into the aqueous mixture 16 to modify the pH of the aqueous mixture 16 to the desirable pH range, which is less acidic (5-7) than the mixture without the pH adjuster 14, or is basic (7-9).

In yet another example, when $TiO_2$ is used as the metal oxide material starting material 12, it is desirable that the pH of the final aqueous mixture 16 range from about 7 to about 10. In this example, the pH adjuster 14 may be used because the aqueous mixture 16 may not be in a desirable pH range at the outset. For example, when $TiO_2$ is added to deionized water, the mixture 16 may have a pH that is about 7. Therefore, the pH adjuster 14 may be added into the aqueous mixture 16 to render the pH of the aqueous mixture 16 more basic (e.g., to a pH ranging from about 7 to about 10).

Turning to FIG. 1B, after the metal oxide starting material 12 and the pH adjuster 14 are added to the deionized water in the container 18, the aqueous mixture 16 may be thoroughly mixed. The aqueous mixture 16 may be mixed by stirring until the metal oxide starting material 12 and the pH adjuster 14 are dispersed and/or dissolved in the deionized water of the aqueous mixture 16. For example, the mixture may be mixed for a time ranging from about 5 minutes to about 2 hours using a magnetic stir bar, a stirring rod by hand, or any other suitable means known to a skilled artisan. In an example, the aqueous mixture 16 is mixed for 30 minutes.

Referring now to FIGS. 1C and 1D, after mixing the aqueous mixture 16, the aqueous mixture 16 is added to a closed system 20. In an example, the closed system 20 is an autoclave. Some examples of the autoclave include a polytetrafluoroethylene-lined (e.g., TEFLON®-lined) or copper-lined stainless steel autoclave. A TEFLON®-lined autoclave is used at temperatures below 200° C. A copper-lined autoclave is used at temperatures at or above 200° C.

The hydrothermal synthesis is performed in the closed system 20. More particularly, within the closed system 20, the aqueous mixture 16 is subjected to heat and vapor pressure for a certain amount of time. The temperature of the heat ranges from about 150° C. to about 200° C. The vapor pressure ranges from about 700 psi to about 1380 psi within the temperature range of from about 150° C. to about 200° C. The heat and vapor pressure are applied for a time ranging from about 24 hours to about 48 hours. In an example, the closed system 20 may be raised to a temperature of about 180° C. for about 48 hours. It is believed the vapor pressure may be around 1000 psi in the closed system 20 at this temperature. The application of heat and vapor pressure in the closed system 20 forms a precursor nanostructure 24 from the metal oxide starting material 12 within the aqueous mixture 16.

In general, it is believed that the cation of the pH adjuster 14 participates in a reaction with the metal oxide starting material 12. Prior to being subjected to heat and vapor pressure, the metal oxide starting material 12 has a crystalline structure. When the heat and vapor pressure are applied in the closed system 20, it is believed that the cation of the pH adjuster 14 reacts with the metal oxide starting material 12 to form an amorphous layer at least on the surface of the metal oxide stating material 12. During the application of heat and vapor pressure, there is a high energy input within the closed system 20. The high energy input is believed to contribute to the formation of the amorphous layer at the surface of the metal oxide starting material 12 (e.g., nanoparticles). As the high energy input continues (i.e., continuous application of heat and vapor pressure) in the closed system 20, it is believed that the amorphous layer at the surface of the metal oxide starting material 12 undergoes recrystallization to form recrystallized metal oxide materials. With the continued high energy input, it is believed that the recrystallized metal oxide materials grow into nanosheet structures. It is further believed that the nanosheet structures separate from the unreacted crystalline metal oxide starting material 12 and roll into a nanotube structure to form the precursor nanostructure 24. It is believed that the reaction(s) causing the phase transformation (i.e., crystalline→amorphous→recrystalline) and structural transformation (i.e., nanoparticles→nanosheets→nanotubes) continue until there are no more metal oxide starting material 12 nanoparticles available to participate in the reaction(s) or until the high energy input (hydrothermal process) ceases.

In addition, after hydrothermal synthesis, the precursor nanostructure 24 is removed from the closed system 20, and an ion exchange process is performed (not shown). The ion exchange may take place between the cation of the pH adjuster 14 (which has reacted with the starting material 12 to form the precursor nanostructure 24) and protons that are introduced to the precursor nanostructure 24. For example, the cation from the pH adjuster 14 may initially react with the metal oxide starting material 12 during hydrothermal synthesis to form the precursor nanostructure 24, and then the cation of the precursor nanostructure 24 may be exchanged with protons that are present in an acid that is introduced, such as HCl (hydrochloric acid). As an example, the precursor nanostructure 24 is removed from the closed system 20 after the closed system 20 is allowed to cool down. The precursor nanostructure 24 is added to a beaker and is stirred while 1M HCl is added. In this example, the HCl may be added until the pH reaches about 7.

In an example of the method, anatase $TiO_2$ is the metal oxide starting material 12 and NaOH is the pH adjuster 14. The anatase $TiO_2$ and NaOH are added to deionized water to form an example of the aqueous mixture 16. The aqueous mixture 16 is introduced into the closed system 20, and then heat and vapor pressure are applied within the closed system 20. It is believed that the $TiO_2$ at the surface reacts with the $Na^+$ cations from the NaOH to initially form a $Na_2Ti_3O_7$ amorphous layer on the surface of the $TiO_2$ metal oxide starting material 12. As the high energy input continues within the closed system, 20, a $Na_2Ti_3O_7$ crystalline material recrystallizes from the $Na_2Ti_3O_7$ amorphous layer. The recrystallized $Na_2Ti_3O_7$ grows into a nanosheet structure, which falls off of the surface of the metal oxide starting material 12. These nanosheet structure rolls into a nanotube structure (e.g., precursor nanostructure 24) as heat and vapor pressure are continuously applied.

After hydrothermal synthesis, an acid may be introduced so that the ion exchange is performed. In this example, the ion exchange occurs between the $Na^+$ cation (of the recrystallized $Na_2Ti_3O_7$) and $H^+$ cations (from HCl) to form recrystallized $H_2Ti_3O_7$. In this example, the recrystallized $Na_2Ti_3O_7$ is an example of the precursor nanostructure 24 after hydrothermal synthesis and before ion exchange, and the crystallized $H_2Ti_3O_7$ is an example of the precursor nanostructure 24 after both hydrothermal synthesis and ion exchange.

In yet another example, $AlCl_3$ is used as the metal oxide starting material 12 in the aqueous mixture 16, and a similar phase and structural transformation may take place as previously described herein. However, when $AlCl_3$ is used, no ion-exchange is necessary. Instead, the $AlCl_3$ precipitates amorphous $Al(OH)_3$ nanoparticles when NaOH, as the pH adjuster 14, is added to the aqueous mixture 16. In this example, the application of heat and vapor pressure to the closed system 20 causes the amorphous $Al(OH)_3$ nanoparticles to transform to $\gamma$-$Al(OH)_3$ nanotubes, which are another example of the precursor nanostructure 24. It is believed the following reactions (I) and (II) occur:

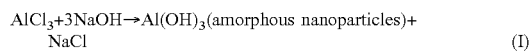

$$AlCl_3 + 3NaOH \rightarrow Al(OH)_3 \text{(amorphous nanoparticles)} + NaCl \qquad (I)$$

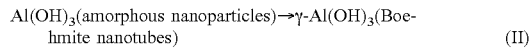

$$Al(OH)_3 \text{(amorphous nanoparticles)} \rightarrow \gamma\text{-}Al(OH)_3 \text{(Boehmite nanotubes)} \qquad (II)$$

After the reaction(s) take place in the closed system 20 or in the closed system 20 and the system used for ion exchange, it is to be understood that the aqueous mixture 16 has been altered (denoted by reference numeral 16' in FIGS. 1D and 1E), and at least includes the precursor nanostructure 24. At least some deionized water is present in the mixture 16'. In some instances, other ions, such as $Na^+$ or $Cl^-$ shown in equation I above, and $K^+$ or $NH^+$ from the pH adjuster 14, may also be present.

Referring now to FIG. 1E, the container 18 with the aqueous mixture 16' may be removed from the closed system 20. When ion exchange is performed outside of the closed system 20, this step occurs prior to the ion exchange. The precursor nanostructure 24 may then be removed from the aqueous mixture 16' using any separation technique known to a skilled artisan. For example, the precursor nanostructure 24 may be removed by vacuum filtration, centrifugal force, or any other suitable means. The precursor nanostructure 24 may be washed multiple times with copious amounts of deionized water during the separation of the precursor nanostructure 24 from the aqueous mixture 16'.

After the precursor nanostructure 24 is washed, the precursor nanostructure 24 may be dried at a temperature ranging from about 60° C. to about 80° C. for a time ranging from about 12 to about 24 hours. A subsequent heat treatment may be applied to the dried precursor nanostructure 24. In an example, the heat treatment is an annealing process (i.e., heating followed by slow furnace cooling). The heat treatment may be applied for a time ranging from about 3 hours to about 5 hours at a temperature ranging from about 350° C. to about 700° C. In an example, the heat treatment is applied at 350° C. for about 5 hours. The heat treatment dehydrates the precursor nanostructure 24 through the release of water vapor. Sintering also occurs during heat treatment, which transforms the nanotubes or other precursor nanostructure 24 into nanorods. In addition, water vaporization generates three-dimensional interconnected pores throughout the nanorods. As such, the heat treatment causes the formation of the porous, one-dimensional metal oxide nanorods 26.

Figure 4:
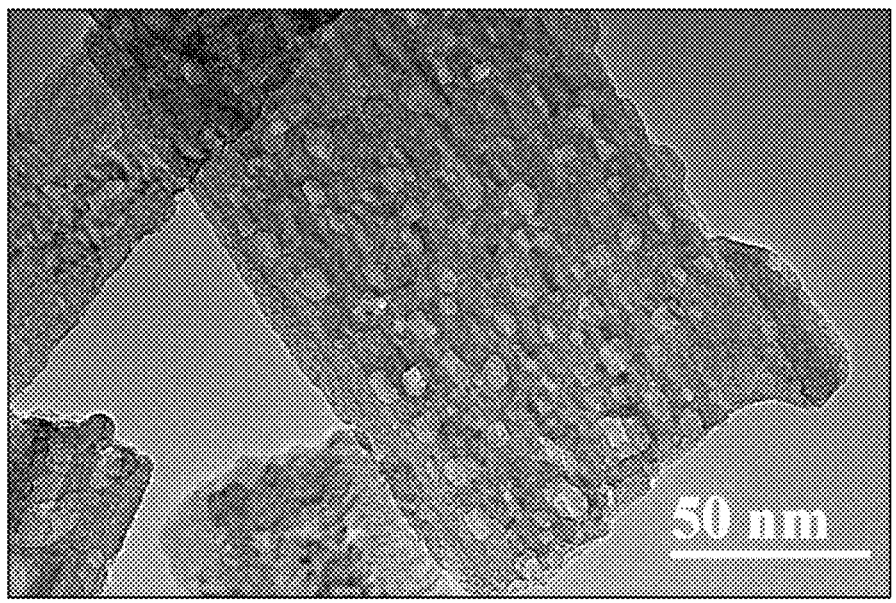
FIG. 4 is a transmission electron microscope ("TEM") image of an example of the one-dimensional metal oxide nanorods formed from an example of the method disclosed herein.

FIG. 4 is a TEM of one example of the porous, one-dimensional metal oxide nanorods 26. As illustrated in the TEM image of FIG. 4, the three-dimensional pores 28 have a diameter within the porous, one-dimensional metal oxide nanorods 26. In an example, the diameter of the pores 28 ranges from about 2 nm to about 6 nm. The three-dimensional structure of the pores 28 essentially creates a polysulfide reservoir, and thus enhances the ability of the porous, metal oxide nanorods 26 to capture the polysulfides within the positive electrode.

In some examples, the following reactions (III), (IV) take place during annealing/heat treatment:

$$H_2Ti_3O_7 \rightarrow 3TiO_2(B) + H_2O \qquad (III)$$

$$\gamma\text{-}Al(OH)_3 \rightarrow \gamma\text{-}Al_2O_3 + H_2O \qquad (IV)$$

In each reaction (III), (IV), the annealing and sintering of the precursor nanostructure 24 (i.e., $H_2Ti_3O_7$ or $\gamma$-$Al(OH)_3$) forms the final porous, one-dimensional metal oxide nanorods 26, such as $TiO_2$ and $Al_2O_3$, respectively. Examples of the morphologies of the final porous, one-dimensional metal oxide nanorods 26 are shown in FIG. 4 ($TiO_2$ nanorods) and FIG. 5 ($Al_2O_3$ nanorods). A description of how these nanorods were formed is set forth in the examples section. In addition, the porous, one-dimensional metal oxide nanorods 26 are further described in the examples section in reference to FIGS. 6 and 7, which provide X-ray diffraction (XRD) results before and after the heat treatment described herein.

In yet another example, $SiO_x$ ($0 < x \leq 2$) may be the metal oxide of the porous, one-dimensional metal oxide nanorods 26. In this example, the metal oxide starting material 12 is $Si(OH)_4$. $Si(OH)_4$ is silicic acid, which is a white gelatinous precipitate in deionized water, obtained from a reaction of hydrous $Na_2SiO_3$ and 1M HCl. The obtained $Si(OH)_4$ precipitate is washed with deionized water before hydrothermal synthesis. The $Si(OH)_4$ precipitate is subjected to a similar hydrothermal synthesis and water removal process as previously described herein. During hydrothermal synthesis, the $Si(OH)_4$ precipitate dissolves in the base that is used. Carbon may be added to act as a nucleation site for the $SiO_x$. The cations of the base may be incorporated into the $Si(OH)_4$ precipitate during hydrothermal synthesis, and thus ion exchange may be performed as previously described. The heat treatment burns off the carbon, and the $SiO_x$ (0<x<2) product is formed. In this example, the product of the reaction(s) may be $SiO_x$ (0<x<2), and an additional oxidation step may be performed to obtain $SiO_2$.

FIG. 1F schematically illustrates one porous, one-dimensional metal oxide nanorod 26, which includes the metal oxide nanorod 22 and pores 28. The porous, one-dimensional metal oxide nanorods 26 have a diameter ranging from about 10 nm to about 100 nm. The length of the porous, one-dimensional metal oxide nanorods 26 ranges from about 80 nm to about 3 microns. It is to be understood that each of the porous, one-dimensional metal oxide nanorods 26 has a diameter that is much less than its length, thus making it one-dimensional. The one-dimensional structure of the metal oxide nanorods 22 has a larger surface when compared to a metal oxide nanoparticle (which may be considered to be zero-dimensional because it is essentially a point). In an example, the surface area of the porous, one-dimensional metal oxide nanorods 26 ranges from about 130 $m^2/g$ to about 500 $m^2/g$. In comparison, nanoparticles generally have a surface area ranging from greater than 0 $m^2/g$ to 100 $m^2/g$. The larger surface area in the examples disclosed herein provides an increased area for trapping polysulfides. Additionally, the one-dimensional nanorods 26 enhance the mechanical strength of the electrode when compared to an electrode made with metal oxide nanoparticles. In particular, the coating quality of a mixture including the one-dimensional nanorods 26 is improved because the nanorods 26 can lie down laterally with respect to a surface of a current collector on which the mixture is applied during electrode formation. This orientation improves the mechanical strength of the resulting electrode.

Referring now to FIG. 1G, once the porous, one-dimensional metal oxide nanorods 26 are formed, the nanorods 26 may additionally be doped with a doping agent 30 to form doped porous, one-dimensional metal oxide nanorods 32. Dopants may be added to improve conductivity and/or structural stability of the nanorods 32. In an example, the doping agent 30 may be added by a subsequent hydrothermal synthesis process. Alternatively, the doping agent 30 may be added to the aqueous solution 16 during the initial hydrothermal synthesis. In this example, a subsequent hydrothermal synthesis process would not be used. As an example of the subsequent hydrothermal synthesis process, the porous, one-dimensional metal oxide nanorods 26 are added to an acid or water containing the doping agent. This mixture may be sealed in the closed system 20, such as a TEFLON®-lined stainless steel autoclave. The mixture is then subjected to an additional hydrothermal treatment at a temperature ranging from about 150° C. to about 200° C. for a time ranging from about 12 hours to about 24 hours.

In an example, the dopant is present in the acid or water in an amount ranging from about 0.01 mol % to about 1 mol %. The doping agent is selected from the group consisting of chromium ions, vanadium ions, zirconium ions, niobium ions, yttrium ions, silicon ions, and lanthanum ions. It is believed that adding a doping agent 30 to the porous, one-dimensional metal oxide nanorods 26 enhances the electrical conductivity and further stabilizes the structure of the porous, one-dimensional metal oxide nanorods 26.

After obtaining the porous, one-dimensional metal oxide nanorods 26, 32, which may include the doping agent 30, the porous, one-dimensional metal oxide nanorods 26, 32 may be added, as an additive, to a positive electrode composition. The positive electrode composition includes at least a sulfur-based active material. This is described in further detail in reference to FIG. 2.

Referring to FIG. 2, examples of the method for preparing the positive electrode 42 will now be discussed. In addition to the porous, one-dimensional metal oxide nanorods 26 disclosed herein, the positive electrode 42 may include the sulfur-based active material 36, a binder 40, and a conductive filler 38.

In the examples of the method disclosed herein, the porous, one-dimensional metal oxide nanorods 26 are mixed with the binder 40, the conductive filler 38, and the sulfur-based active material 36 in water or an organic solvent depending on the binder 40 selected to form a dispersion or mixture. It is to be understood that the porous, one-dimensional metal oxide nanorods 26 are not embedded within the sulfur-based active material 36, the binder 40, or the conductive filler 38, either in the dispersion or mixture, or after the water or organic solvent is removed to form the positive electrode 42.

The sulfur-based active material 36 may be any sulfur material that can sufficiently undergo lithium alloying and dealloying with aluminum or another suitable current collector functioning as the positive terminal of the lithium-sulfur battery 100. An example of the sulfur based active material 36 may be a sulfur-carbon composite. In an example, the amount of sulfur in the sulfur-carbon composite ranges from about 20 wt % to about 95 wt %.

As mentioned above, the sulfur-based active material 36 may be intermingled with the binder 40 and the conductive filler 38. Suitable binders 40 include carboxymethyl cellulose (CMC), styrene-butadiene rubber (SBR), polyacrylic acid (PAA), polyvinyl alcohol (PVA), poly(acrylamide-co-diallyl dimethyl ammonium chloride), sodium alginate, polyvinylidene fluoride (PVdF), an ethylene propylene diene monomer (EPDM) rubber, or other water-soluble or organic solvent-based binders. The binder 40 structurally holds the sulfur-based active material 36 and the conductive filler 38 together.

An example of the conductive filler 38 is a high surface area carbon, such as acetylene black or activated carbon. Other examples of suitable conductive fillers 38 include graphene, graphite, carbon nanotubes, and/or carbon nanofibers. The conductive filler 38 ensures electron conduction between the positive-side current collector 34 and the sulfur-based active material 40 in the positive electrode 42. In an example, the positive electrode 42 may also be encapsulated within hollow carbon.

In an example, the porous, one-dimensional metal oxide nanorods 26 are mixed with the binder 40, the conductive filler 38, and the sulfur-based active material 36. All of the components may be manually mixed by dry-grinding. After all the components are ground together, the ground components are added with water or organic solvent (depending on the binder 40 used) to form the dispersion/mixture. The dispersion/mixture may be mixed by milling. Milling aids in transforming the dispersion/mixture into a coatable slurry. Low-shear milling or high-shear milling may be used to mix the dispersion/mixture. The dispersion/mixture milling time ranges from about 10 minutes to about 20 hours depending on the milling shear rate. In an example, a rotator mixer is used for about 20 minutes at about 2000 rpm to mill the dispersion/mixture.

In one example of the dispersion/mixture, the amount of the sulfur-based active material 36 ranges from about 50 wt % to about 95 wt % (based on total solid wt % of the dispersion/mixture), the amount of the conductive filler 38 ranges from about 5 wt % to about 20 wt % (based on total solid wt % of the dispersion/mixture), the amount of the binder 40 ranges from about 5 wt % to about 20 wt % (based on total solid wt % of the dispersion/mixture), and the amount of the porous, one-dimensional metal oxide nanorods 26 ranges from greater than 0 wt % up to about 2 wt % (based on the total solid wt % of the dispersion/mixture).

The slurry is then deposited onto the support 34. In an example, the support 34 is the positive-side current collector. It is to be understood that the support 34 may be formed from aluminum or any other appropriate electrically conductive material known to skilled artisans. The support 34 that is selected should be capable of collecting and moving free electrons to and from an external circuit connected thereto.

The slurry may be deposited using any suitable technique. As examples, the slurry may be cast on the surface of the support 34, or may be spread on the surface of the support 34, or may be coated on the surface of the support 34 using a slot die coater.

The deposited slurry may be exposed to a drying process in order to remove any remaining solvent. Drying may be accomplished using any suitable technique. For example, the drying is conducted at ambient conditions (i.e., at room temperature, about 18° C. to 22° C., and 1 atmosphere). Drying may be performed at an elevated temperature ranging from about 50° C. to about 80° C. In some examples, vacuum may also be used to accelerate the drying process. As one example of the drying process, the deposited slurry may be exposed to ambient drying for about 12 hours to about 24 hours, followed by vacuum drying at about 70° C. for about 20 minutes to about 1 hour.

The drying process results in a coating formed on the surface of the support 34. This coating is the positive electrode 42. In an example, the thickness of the dried slurry (i.e., positive electrode 42) ranges from about 5 μm to about 200 μm. In another example, the thickness of the dried slurry (i.e., positive electrode 42) ranges from about 10 μm to about 100 μm.

During the formation of the positive electrode 42, the water and/or organic solvent(s) is/are removed, and thus the resulting positive electrode 42 includes from about 50 wt % to about 95 wt % (based on total wt % of the positive electrode 42) of the active material(s) 36, from about 5 wt % up to 20 wt % (based on total wt % of the positive electrode 42) of the conductive filler 38, from about 5 wt % up to 20 wt % (based on total wt % of the positive electrode 42) of the binder 40, and from greater than 0 wt % up to about 2 wt % (based on the total wt % of the positive electrode 42) of the porous, one-dimensional metal oxide nanorods 26.

Figure 3:
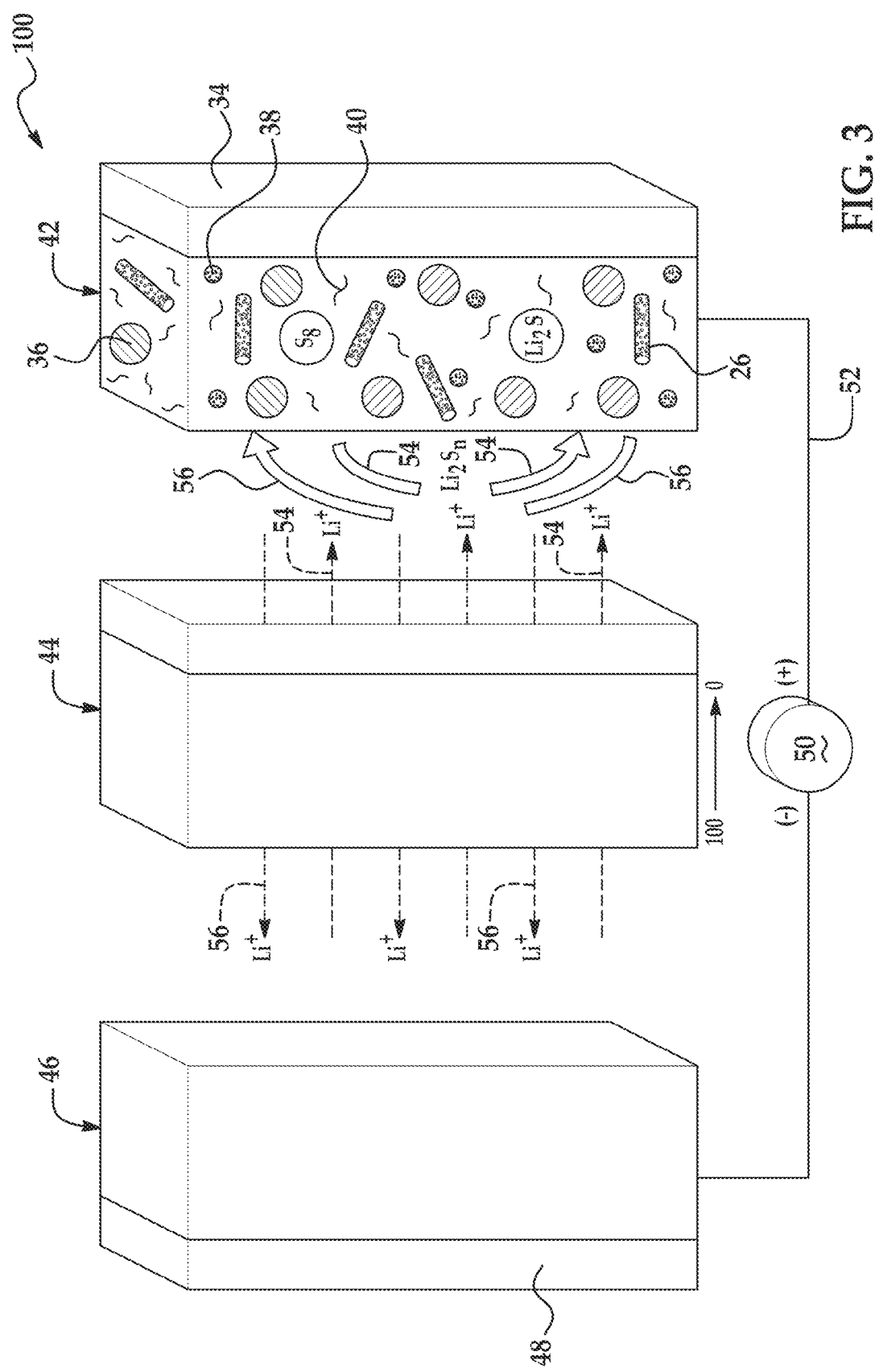
FIG. 3 is a perspective schematic view of an example of a sulfur-based battery, including an example of the positive electrode disclosed herein.

Referring now to FIG. 3, an example of a lithium-sulfur battery 100 with the positive electrode 42 described herein is shown. The lithium-sulfur battery 100 contains a negative electrode 46, a negative side current collector 48, the positive electrode 42, the positive-side current collector 34, and a porous separator 44 positioned between the negative electrode 46 and the positive electrode 42.

For the lithium-sulfur battery 100, the negative electrode 46 may include any active material that can sufficiently provide a lithium source for lithium redox reactions that does not react with the current collector. In an example, the current collector may be copper or another suitable current collector functioning as the negative terminal of the lithium-sulfur battery 100. Examples of active materials include lithium metal (alone or encapsulated in carbon) or lithiated silicon.

The active material of the negative electrode 46 may be intermingled with a binder and conductive filler (neither of which is shown in FIG. 3). Examples of the binder may include at least one of polyvinylidene fluoride (PVdF), polyethylene oxide (PEO), an ethylene propylene diene monomer (EPDM) rubber, carboxymethyl cellulose (CMC)), styrene-butadiene rubber (SBR), styrene-butadiene rubber carboxymethyl cellulose (SBR-CMC), polyacrylic acid (PAA), cross-linked polyacrylic acid-polyethylenimine, polyimide, polyvinyl alcohol (PVA), poly(acrylamide-co-diallyl dimethyl ammonium chloride), sodium alginate, other water or organic solvent based binders, or any other suitable binder material known to skilled artisans.

The conductive filler of the negative electrode 46 may be a high surface area carbon, such as acetylene black (i.e., carbon black). Other examples of suitable conductive fillers include graphene, graphite, carbon nanotubes, and/or carbon nanofibers. In yet another example, a combination of conductive fillers is used, such as carbon black and carbon nanofibers. The conductive filler is included to ensure electron conduction between a negative-side current collector 48 and the active material. When an active material that possesses suitable electron conductivity is selected for the negative electrode 46, such as a metal lithium active material, the conductive filler may not be included. As such, in another example, no conductive filler is used in the negative electrode 46.

The negative electrode 46 is adjacent to the negative side current collector 48. It is to be understood that the negative side current collector 48 may be formed from copper or any other appropriate electrically conductive material known to skilled artisans. The negative side current collector 48 that is selected should be capable of collecting and moving free electrons to and from an external circuit connected thereto.

The porous separator 44 in FIG. 3, which operates as both an electrical insulator and a mechanical support, is sandwiched between the negative electrode 46 and the positive electrode 42 to prevent physical contact between the two electrodes 46, 42 and the occurrence of a short circuit.

The porous separator 44 may be a polyolefin membrane. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement, including those of a block copolymer or a random copolymer. The same holds true if the polyolefin is a heteropolymer derived from more than two monomer constituents. As examples, the polyolefin membrane may be formed of polyethylene (PE), polypropylene (PP), a blend of PE and PP, or multi-layered structured porous films of PE and/or PP.

In other examples, the porous separator 44 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany), ZENITE® (DuPont, Wilmington, Del.), poly(p-hydroxybenzoic acid), polyaramides, polyphenylene oxide, and/or combinations thereof. In yet another example, the porous separator 44 may be chosen from a combination of the polyolefin (such as PE and/or PP) and one or more of the polymers listed above.

The porous separator 44 may contain a single layer or a multi-layer laminate fabricated from either a dry or wet process. For example, a single layer of the polyolefin and/or other listed polymer may constitute the entirety of the porous separator 44. As another example, however, multiple discrete layers of similar or dissimilar polyolefins and/or polymers may be assembled into the porous separator 44. In one example, a discrete layer of one or more of the polymers may be coated on a discrete layer of the polyolefin to form the porous separator 44. Further, the polyolefin (and/or other polymer) layer, and any other optional polymer layers, may further be included in the porous separator 44 as a fibrous layer to help provide the porous separator 44 with appropriate structural and porosity characteristics. Still other suitable porous separators 44 include those that have a ceramic layer attached thereto, and those that have ceramic filler in the polymer matrix (i.e., an organic-inorganic composite matrix).

For the lithium-sulfur battery 100, the electrolyte solution includes an ether based solvent and a lithium salt dissolved in the ether based solvent. Examples of the ether based solvent include cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof. Examples of the lithium salt include $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$(LIFSI), $LiN(CF_3SO_2)_2$(LITFSI), $LiB(C_2O_4)_2$(LiBOB), $LiBF_2(C_2O_4)$ (LiODFB), $LiPF_4(C_2O_4)$(LiFOP), $LiNO_3$, $LiPF_6$, and mixtures thereof.

The positive and negative electrodes 42, 46 are in contact, respectively, with current collectors 34, 48. The negative-side current collector 48 collects and moves free electrons to and from the external circuit 52. The positive-side current collector 34 collects and moves free electrons to and from the external circuit 52.

The lithium-sulfur battery 100 may support a load device 50 that can be operatively connected to the external circuit 52. The load device 50 receives a feed of electrical energy from the electric current passing through the external circuit 52 when the lithium-sulfur battery 100 is discharging. While the load device 50 may be any number of known electrically-powered devices, a few specific examples of a power-consuming load device include an electric motor for a hybrid vehicle or an all-electrical vehicle, a laptop computer, a cellular phone, and a cordless power tool. The load device 50 may also, however, be an electrical power-generating apparatus that charges the lithium-sulfur battery 100 for purposes of storing energy. For instance, the tendency of windmills and solar panels to variably and/or intermittently generate electricity often results in a need to store surplus energy for later use.

The lithium-sulfur battery 100 can include a wide range of other components that, while not depicted here, are nonetheless known to skilled artisans. For instance, the lithium-sulfur battery 100 may include a casing, gaskets, terminals, tabs, and any other desirable components or materials that may be situated between or around the negative electrode 46 and the positive electrode 42 for performance related or other practical purposes. Moreover, the size and shape of the lithium-sulfur battery 100, as well as the design and chemical make-up of its main components, may vary depending on the particular application for which it is designed. Battery powered automobiles and hand held consumer electronic devices, for example, are two instances where the lithium-sulfur battery 100 would most likely be designed to different size, capacity, and power-output specifications. The lithium-sulfur battery 100 may also be connected in series and/or in parallel with other similar lithium-sulfur batteries 100 to produce a greater voltage output and current (if arranged in parallel) or voltage (if arranged in series) if the load device 50 so requires.

The lithium-sulfur battery 100 can generate a useful electric current during battery discharge (shown by reference numeral 54 in FIG. 3). During discharge, the chemical processes in the battery 100 include lithium (Li+) dissolution from the surface of the negative electrode 46 and incorporation of the lithium cations into alkali metal polysulfide salts (i.e., $Li_2S$) in the positive electrode 42. As such, polysulfides are formed (sulfur is reduced) on the surface of the positive electrode 42 in sequence while the battery 100 is discharging. The chemical potential difference between the positive electrode 42 and the negative electrode 46 (ranging from approximately 1.5 to 3.0 volts, depending on the exact chemical make-up of the electrodes 46, 42) drives electrons produced by the dissolution of lithium at the negative electrode 46 through the external circuit 52 towards the positive electrode 42. The resulting electric current passing through the external circuit 52 can be harnessed and directed through the load device 50 until the lithium in the negative electrode 46 is depleted and the capacity of the lithium-sulfur battery 100 is diminished.

The one-dimensional porous nanorods 26 in the positive electrode 42 trap the polysulfides, and prevent them from migrating across the porous separator 22 to the negative electrode 46.

The lithium-sulfur battery 100 can be charged or re-powered at any time by applying an external power source to the lithium-sulfur battery 100 to reverse the electrochemical reactions that occur during battery discharge. During charging (shown at reference numeral 56 in FIG. 3), lithium plating to the negative electrode 46 takes place, and sulfur formation at the positive electrode 42 takes place. The connection of an external power source to the lithium-sulfur battery 100 compels the otherwise non spontaneous oxidation of lithium at the positive electrode 42 to produce electrons and lithium ions. The electrons, which flow back towards the negative electrode 46 through the external circuit 52, and the lithium ions (Li+), which are carried by the electrolyte across the porous membrane 44 back towards the negative electrode 46, reunite at the negative electrode 46 and replenish it with lithium for consumption during the next battery discharge cycle. The external power source that may be used to charge the lithium-sulfur battery 100 may vary depending on the size, construction, and particular end-use of the lithium-sulfur battery 100. Some suitable external power sources include a battery charger plugged into an AC wall outlet and a motor vehicle alternator.

To further illustrate the present disclosure, examples are given herein. It is to be understood that these examples are provided for illustrative purposes and are not to be construed as limiting the scope of the disclosure.

EXAMPLES

Example 1

Figure 6:
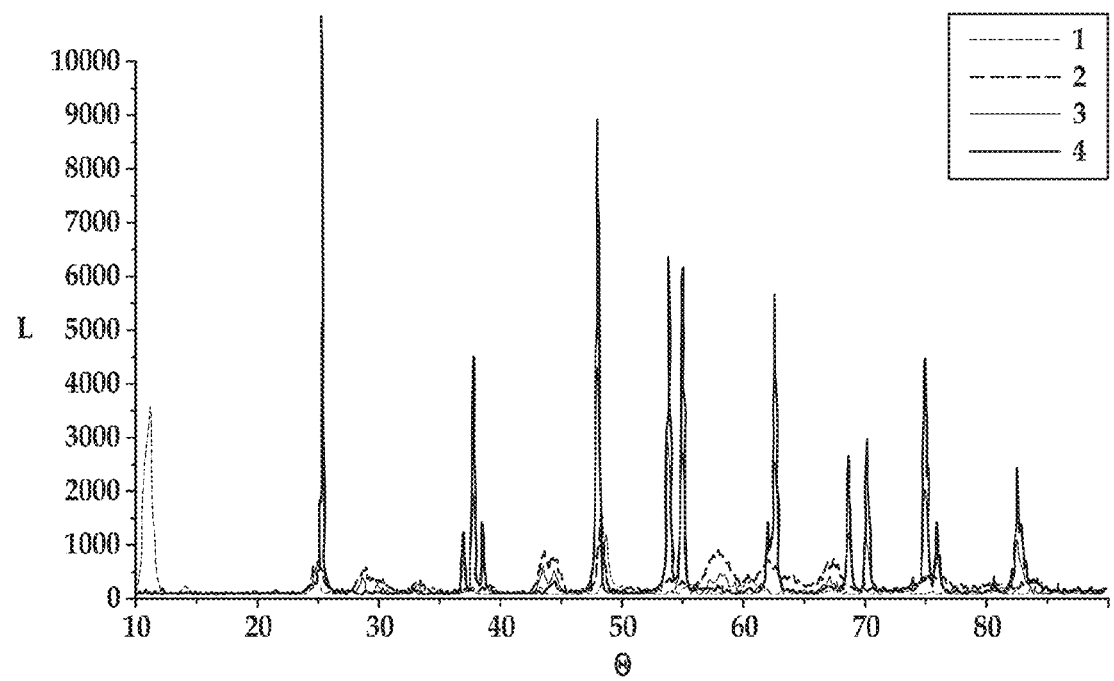
FIG. 6 is a graph obtained from an X-ray diffraction ("XRD") of nanostructure precursors obtained from hydrothermal synthesis using $TiO_2$ as the starting material, and of various nanorods obtained from heat treating the nanostructure precursors at different temperatures.
Figure 7A:
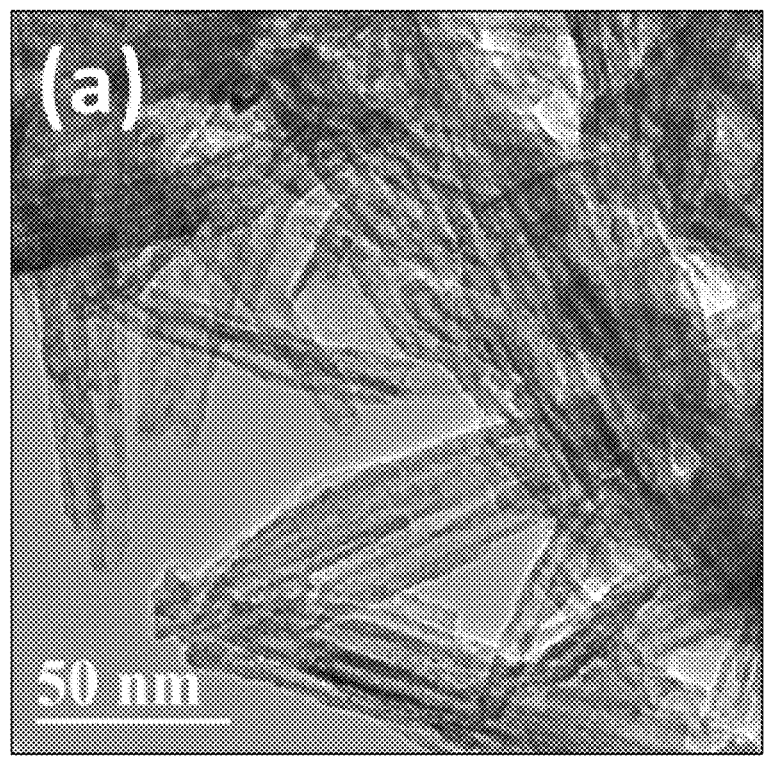
FIGS. 7A and 7B are TEM images of $H_2Ti_3O_7$ nanorods (nanostructure precursors) obtained from hydrothermal synthesis using $TiO_2$ as the starting material.
Figure 7B:
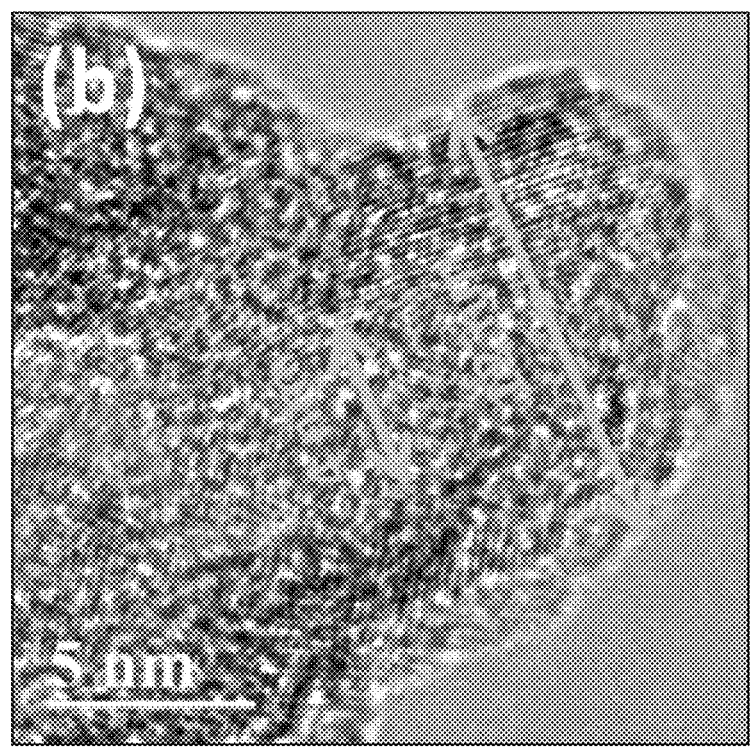

$TiO_2$ porous nanorods were prepared according to an example disclosed herein. An amount of about 3 grams of $TiO_2$ anatase nanoparticles having an average diameter ranging from about 30 nm to about 200 nm was added to 20 mL of deionized water and 40 mL of 10M NaOH. The mixture was introduced into a TEFLON®-lined stainless steel autoclave. The processing parameters for hydrothermal synthesis included exposing the aqueous mixture to a temperature of 180° C. for about 48 hours. It is believed that the pressure in the autoclave was about 1000 psi during hydrothermal synthesis. At the end of the 48 hour period, the reaction product was removed from the autoclave. An ion-exchange was performed on the reaction product using 1M HCl solution until a pH of about 7 was obtained. After ion-exchange, the reaction product was filtered, washed, and dried to obtain the precursor nanotubes, $H_2Ti_3O_7$. The $H_2Ti_3O_7$ composition of the precursor nanotubes was confirmed using X-ray diffraction, the results of which are shown in FIG. 6 and discussed herein below. The precursor nanostructure included nanotubes having an average length ranging from 80 nm to about 200 nm, an average inner diameter of about 4 nm and an average outer diameter of about 12 nm. These dimensions were determined using the TEM images of the precursor nanostructure (i.e., nanotubes), which are shown in FIGS. 7A and 7B.

The precursor nanotubes were divided into three groups, which were then exposed to annealing at 500° C. for about 5 hours in air, at 600° C. for about 5 hours in air, and at 700° C. for about 5 hours in air. During the heat treatment, the nanotubes sintered to form nanorods, and water was generated as a side product that vaporized to form three-dimensional pores in the nanorods. The reaction during annealing was likely: $H_2Ti_3O_7 \rightarrow TiO_2(B)+H_2O$. A TEM image was taken of the porous $TiO_2$ nanorods. This is shown in FIG. 4, which clearly illustrates the morphology of porous, one-dimensional nanorods. The dimensions of the porous, one-dimensional nanorods may be measured using the TEM image.

XRD results were obtained for the precursor nanotubes and the $TiO_2$ nanorods heat treated at the varying temperatures. These results are shown in FIG. 6. FIG. 6 depicts the diffracted intensity (counts) (Y axis labeled "L") versus the angle of diffraction (2-theta) (X axis labeled as "θ"). The graph shows the presence of $H_2Ti_3O_7$ (indicated as 1 in FIG. 6) in the precursor nanotubes before the heat treatment was applied, but after the hydrothermal synthesis was performed. FIG. 6 also shows the presence of $TiO_2(B)$ after 5 hours of heat treatment at 500° C. (indicated as 2), the presence of $TiO_2(B)+TiO_2$ anatase after 5 hours of heat treatment at 600° C. (indicated as 3), and the presence of $TiO_2$ anatase after 5 hours of heat treatment at 700° C. (indicated as 4). As such, FIG. 6 demonstrates the presence of the precursor nanostructure after hydrothermal synthesis as well as the formation of the porous, one-dimensional nanorods after hydrothermal synthesis and heat treatment at varying temperatures.

$Al_2O_3$ porous nanorods were also prepared according to an example disclosed herein. 5.4 grams of $AlCl_3$ powder (i.e., 12 grams of $AlCl_3.9H_2O$) was added to deionized water. The $AlCl_3$ powder was dissolved in deionized water. The pH of the solution was about 2.6. 1M NaOH, which served as the pH adjuster, was added to the solution dropwise until a white precipitate formed. The pH of this mixture was within the range of from about 5 to about 7. The mixture was introduced into a TEFLON®-lined stainless steel autoclave. The processing parameters for hydrothermal synthesis included exposing the aqueous mixture to a temperature of 200° C. for about a 24 to 36 hour period. It is believed that the pressure in the autoclave was about 1400 psi during hydrothermal synthesis. At the end of the hydrothermal synthesis, the reaction product was removed from the autoclave. The reaction product included nanotubes having an average length ranging from 10 nm to about 200 nm, an average inner diameter of about 4 nm and an average outer diameter of about 12 nm. This was determined using the TEM image of the precursor nanostructure (not shown).

Figure 8:
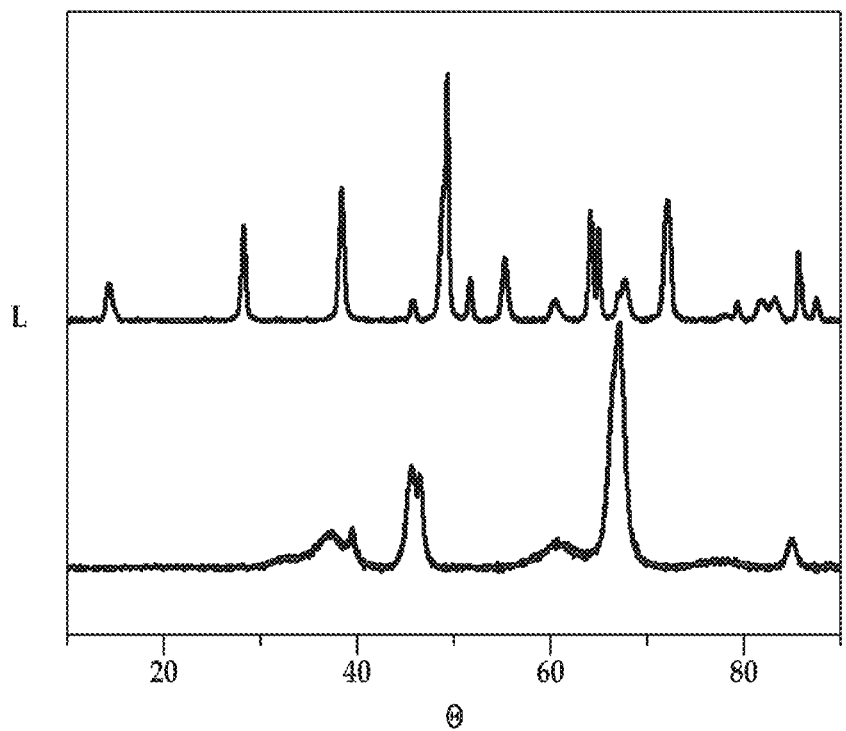
FIG. 8 is a graph obtained from an X-ray diffraction ("XRD") of nanostructure precursors obtained from hydrothermal synthesis using $AlCl_3$ as the starting material, and of nanorods obtained from heat treating the nanostructure precursors.

After the completion of hydrothermal synthesis, the product was washed with deionized water, vacuum filtered, and dried in a vacuum at about 80° C. for about 12 to about 24 hours. X-ray diffraction was performed on the dried product (i.e., the precursor nanostructure). These results are shown in FIG. 8, which depicts the diffracted intensity (counts) (Y axis labeled "L") versus the angle of diffraction (2-theta) (X axis labeled as "θ"). More particularly, the X-ray diffraction result for the precursor nanostructure is represented by the line on the top portion of FIG. 8. This line in the graph indicates that crystalline γ-$Al(OH)_3$ (Boehmite) nanotubes had been formed.

The nanotubes were exposed to annealing at 550° C. for about 5 hours in air. During the heat treatment, the nanotubes sintered to form nanorods, and water was generated as a byproduct and vaporized, forming three-dimensional interconnected pores in the nanorods. The reaction during annealing was likely: γ-$Al(OH)_3 \rightarrow$ γ-$Al_2O_3+H_2O\uparrow$.

Figure 5:
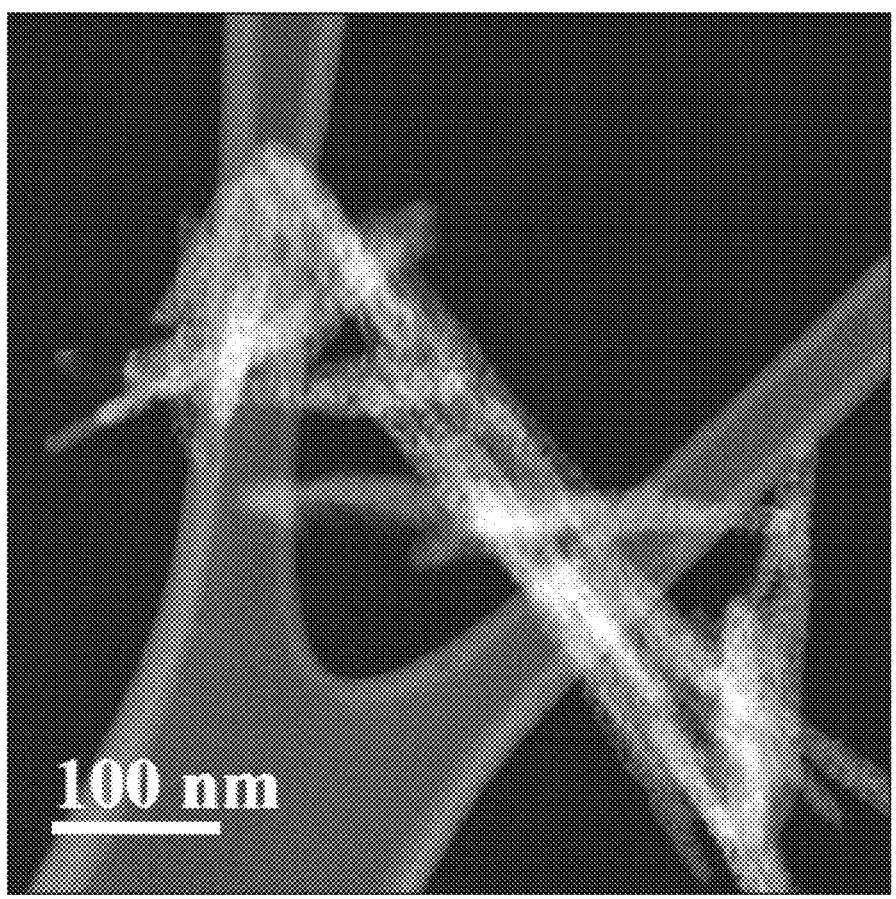
FIG. 5 is a TEM image of another example of the one-dimensional metal oxide nanorods formed from an example of the method disclosed herein.

A TEM image was taken of the porous γ-$Al_2O_3$ nanorods. This is shown in FIG. 5, which clearly illustrates the one-dimensional dimensions.

X-ray diffraction was performed on the nanorods. These results are also shown in FIG. 8. More particularly, these results are represented by the line on the bottom portion of FIG. 8. This line in the graph indicates that crystalline γ-$Al_2O_3$ nanorods had been formed.

Example 2

The porous $TiO_2$ nanorods of Example 1 were incorporated as an additive into an example positive electrode. The Example positive electrode included about 88% of a sulfur/carbon composite active material, about 5% of a binder (sodium alginate), about 5% of a conductive filler (SuperP), and about 2 wt % of the porous $TiO_2$ nanorods.

A comparative positive electrode included all of the same components as the example positive electrode except for the porous $TiO_2$ nanorods. The comparative positive electrode included no porous $TiO_2$ nanorods.

To form the positive example and comparative electrodes, the respective components were mixed in deionized water, to form a dispersion/mixture. Specifically, the dispersion/mixture for the comparative electrode contained about 180 mg of a sulfur-carbon composite as the active material, 10 mg of sodium alginate as the binder, 10 mg of SUPER P® as the conductive filler, and 2500 mg of deionized water. The dispersion/mixture for the example electrode contained about 158.4 mg of the sulfur-carbon composite as the active material, 10 mg of sodium alginate as the binder, 10 mg of SUPER P® as the conductive filler, 4 mg of $TiO_2$ porous, one-dimensional metal oxide nanorods, and 2500 mg of deionized water. The dispersions/mixtures were manually ground and then mixed with a rotator mixer at 2000 rpm for 20 minutes to form two coatable slurries. The slurries were coated using a doctor's blade coating machine on respective aluminum current collectors. The electrode coating and comparative electrode coating were dried overnight at room temperature in air and then dried in vacuum at about 60° C. for about 30 minutes.

Each of the comparative positive electrode and the example positive electrode was used with a lithium metal negative electrode to construct half cells. Coin cells (2032 hardware) were assembled inside an Ar-filled glovebox. Microporous tri-layered polypropylene (PP) and polyethylene (PE) polymer membranes (Celgard 2032, available from Celgard) was used as the separator. The electrolyte consisted of 1M lithium bis(trifluoromethane sulfone) (LiTFSI) in a mixture of organic solvents, such as tetraethylene glycol dimethyl ether (TEGDME) and 1,3-dioxolane (DIOX) at a volume ratio of 1:1. Lithium nitrate ($LiNO_3$) was used as an additive, and 2 wt. % of the lithium nitrate was dissolved in the 1M LiTFSI+TEGDME/DIOX (1:1 volume ratio) mixture.

The coin cells were held at 30° C. to perform electrochemical cycling tests. The cycling tests were carried out at a rate of C/10 and were cycled within the voltage window of 1.7V to 2.8V for at least 100 cycles.

Figure 9:
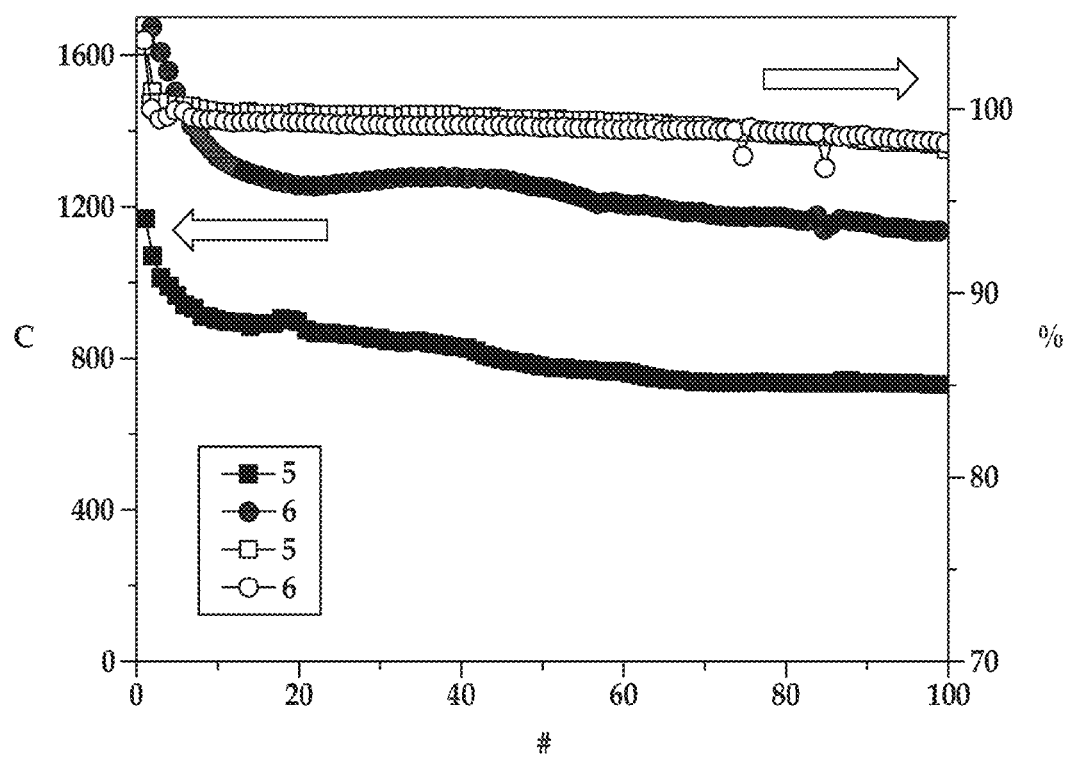
FIG. 9 is a graph exhibiting the discharge capacity (left Y axis) and the coulombic efficiency (right Y axis) versus the cycle number for an example of the positive electrode (including the additive disclosed herein) and for a comparative example.

FIG. 9 depicts the discharge capacity (mAh/g) (Y axis labeled "C" on the left side) versus the cycle index (X axis labeled "#") for the coin cells including the comparative example positive electrode (5) and the example positive electrode (6) with the porous $TiO_2$ nanorod additives. The coulombic efficiency (%) (Y axis labeled "%" on the right side) is also shown. The discharge capacity (solid circles) of the example positive electrode (6) is much greater compared to the discharge capacity (solid squares) of the comparative example positive electrode (5). The coulombic efficiency (hollow circles) of the example positive electrode (6) is slightly higher than the coulombic efficiency (hollow squares) of the comparative example positive electrode (5) as the cycle number is increased to 80 or more.

As illustrated in FIG. 9, the cycling stability during discharging improved when the positive electrode included the porous $TiO_2$ nanorods disclosed herein.

Example 3

$LiNO_3$ has been added into the electrolyte of the sulfur-based batteries to reduce the deleterious effects of polysulfide shuttling. To illustrate the effect of the porous $TiO_2$ nanorods, a positive electrode (8) and a comparative positive electrode (7) were made similarly to example 2, except that no $LiNO_3$ was used.

Figure 10:
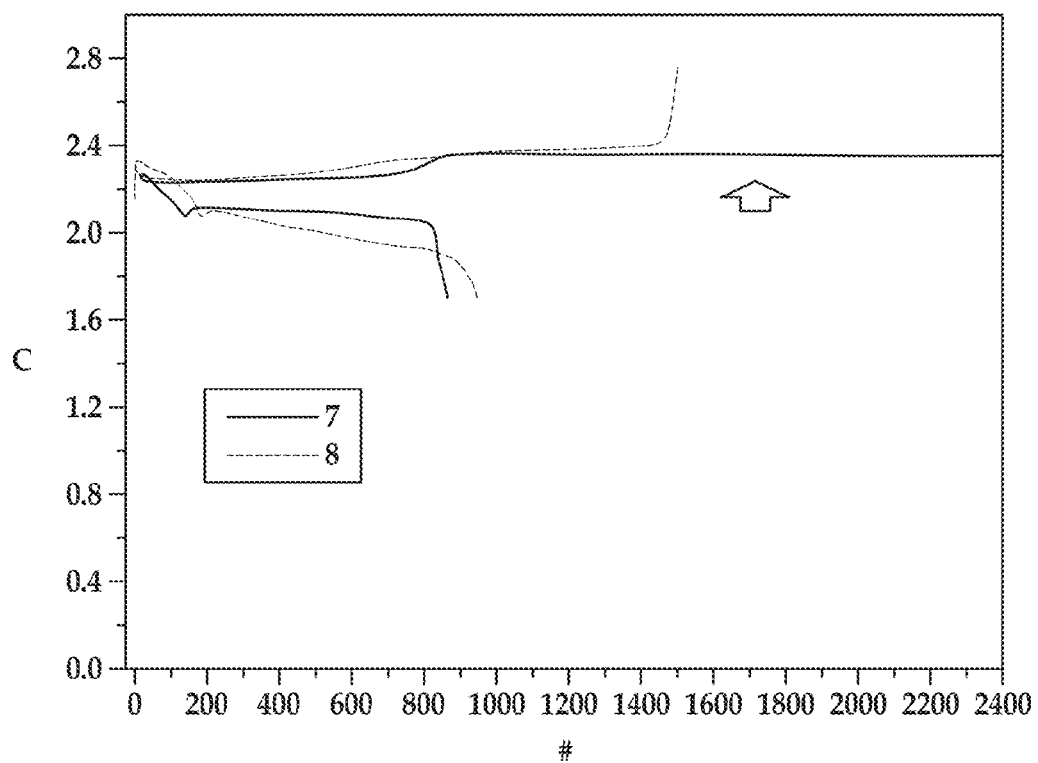
FIG. 10 is a graph exhibiting the voltage versus the specific capacity for another example of the positive electrode (including the additive disclosed herein) and for another comparative example.

The positive electrode (8) and a comparative positive electrode (7) were tested, and FIG. 10 illustrates a graph of the voltage (Y axis labeled "V") applied versus the specific capacity (mAh/g, X axis labeled "SC"). This figure shows that the coin cell including the comparative positive electrode failed to charge up due to the absence of $LiNO_3$. The straight line, referred to as a redox plateau, of the comparative positive electrode (7) at about 2.3 V was indicative of the failure of the comparative positive electrode to charge due to polysulfide shuttling. As illustrated, the redox plateau was significantly suppressed in the positive electrode (8) including the porous $TiO_2$ nanorod additives. The positive electrode with the porous $TiO_2$ nanorod additives was able to charge. FIG. 10 is electrochemical evidence that the porous $TiO_2$ nanorods serve as soluble polysulfide reservoirs, thereby suppressing the polysulfide shuttling effect.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 10 nm to about 100 nm should be interpreted to include not only the explicitly recited limits of from about 10 nm to about 100 nm, but also to include individual values, such as 25 nm, 50 nm, 75 nm, etc., and sub-ranges, such as from about 10 nm to about 30 nm; from about 50 nm to about 75 nm, etc. Furthermore, when "about" is utilized to describe a value, this is meant to encompass minor variations (up to +/−5%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A positive electrode, comprising:
    a sulfur-based active material;
    a binder;
    a conductive filler; and
    porous, one-dimensional metal oxide nanorods mixed throughout the positive electrode, as an additive, with the sulfur-based active material, the binder, and the conductive filler.

2. The positive electrode as defined in claim 1 wherein the porous, one-dimensional metal oxide nanorods are not embedded within the sulfur-based active material, the binder, or the conductive filler.

3. The positive electrode as defined in claim 1 wherein the porous, one-dimensional metal oxide nanorods include pores that are three-dimensional nanopores.

4. The positive electrode as defined in claim 1 wherein the porous, one-dimensional metal oxide nanorods are present in an amount ranging from greater than 0 wt % to about 2 wt % based on a total wt % of the positive electrode material.

5. The positive electrode as defined in claim 1 wherein each of the porous, one-dimensional metal oxide nanorods has a diameter ranging from about 10 nm to about 100 nm and a length ranging from about 10 nm to about 3 microns, wherein the diameter is less than the length.

6. The positive electrode as defined in claim 1 wherein the porous, one-dimensional metal oxide nanorods include pores, each of the pores having a diameter ranging from about 2 nm to about 6 nm.

7. The positive electrode as defined in claim 1 wherein the porous, one-dimensional metal oxide nanorods include a metal oxide selected from the group consisting of $TiO_2$, $Al_2O_3$, $ZrO_2$, $SiO_2$, and combinations thereof.

8. The positive electrode as defined in claim 1 wherein each of the porous, metal oxide nanorods has a surface area ranging from about 130 m$^2$/g to about 500 m$^2$/g.

9. The positive electrode as defined in claim 1 wherein:
the sulfur-based active material is present in an amount ranging from about 50 wt % to about 95 wt % based on a total wt % of the positive electrode material;
the binder is present in an amount ranging from about 5 wt % to about 20 wt % based on the total wt % of the positive electrode material;
the conductive filler is present in an amount ranging from about 5 wt % to about 20 wt % based on the total wt % of the positive electrode material; and
the porous, one-dimensional metal oxide nanorods are present in an amount up to about 2 wt % based on the total wt % of the positive electrode material.

10. The positive electrode as defined in claim 1 wherein the porous, one-dimensional metal oxide nanorods further include a doping agent selected from the group consisting of chromium ions, vanadium ions, zirconium ions, niobium ions, yttrium ions, silicon ions, or lanthanum ions.

11. A sulfur-based battery, comprising:
a positive electrode, including:
a sulfur-based active material;
a binder;
a conductive filler; and
porous, one-dimensional metal oxide nanorods mixed throughout the positive electrode as an additive with the sulfur-based active material, the binder and the conductive filler;
a negative electrode; and
a microporous polymer separator soaked in an electrolyte solution, the microporous polymer separator being disposed between the positive electrode and the negative electrode.

12. The sulfur-based battery as defined in claim 11 wherein the porous, one-dimensional metal oxide nanorods are present in an amount ranging from greater than 0 wt % to about 2 wt % based on a total wt % of the positive electrode material.

13. The sulfur-based battery as defined in claim 11 wherein the porous, one-dimensional metal oxide nanorods include a metal oxide selected from the group consisting of TiO$_2$, Al$_2$O$_3$, ZrO$_2$, SiO$_2$, and combinations thereof.

14. The sulfur-based battery as defined in claim 11 wherein:
the sulfur-based active material is a sulfur-carbon composite; and
the electrolyte solution includes an ether based solvent and a lithium salt dissolved in the ether based solvent, the ether based solvent being selected from the group consisting of 1,3-dioxolane, tetrahydrofuran, 2-methyltetrahydrofuran, 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof, and the lithium salt being selected from the group consisting of LiClO$_4$, LiAlCl$_4$, LiI, LiBr, LiB(C$_2$O$_4$)$_2$ (LiBOB), LiBF$_2$(C$_2$O$_4$) (LiODFB), LiSCN, LiBF$_4$, LiB(C$_6$H$_5$)$_4$, LiAsF$_6$, LiCF$_3$SO$_3$, LiN(FSO$_2$)$_2$ (LIFSI), LiN(CF$_3$SO$_2$)$_2$ (LITFSI), LiPF$_6$, LiPF$_4$(C$_2$O$_4$) (LiFOP), LiNO$_3$, and mixtures thereof.

15. A method, comprising:
forming an aqueous mixture containing nanoparticles of a metal oxide starting material having one of i) a pH ranging from about 7 to about 10 or ii) a pH ranging from about 5 to about 7;
performing hydrothermal synthesis using the aqueous mixture, thereby forming precursor nanostructures from the nanoparticles;
annealing the precursor nanostructures, thereby sintering the precursor nanostructures and vaporizing water from the precursor nanostructures to form porous, one-dimensional metal oxide nanorods; and
preparing a positive electrode having the porous, one-dimensional metal oxide nanorods mixed throughout the positive electrode, as an additive, with a sulfur-based active material, a binder, and a conductive filler.

16. The method as defined in claim 15 wherein, after the hydrothermal synthesis, the method further includes doping the porous, one-dimensional metal oxide nanorods with lanthanum ions, vanadium ions, zirconium ions, niobium ions, yttrium ions, silicon ions or chromium ions.

17. The method as defined in claim 15 wherein the hydrothermal synthesis includes subjecting the aqueous mixture to heat and vapor pressure in a closed system, thereby causing:
an amorphous layer to form on respective surfaces of at least some of the metal oxide nanoparticles;
the amorphous layers to recrystallize to form recrystallized metal oxide materials;
the recrystallized metal oxide materials to grow into nanosheets; and
the nanosheets to separate from the metal oxide nanoparticles to form the precursor nanostructures.

18. The method as defined in claim 15 wherein preparing the positive electrode includes adding the porous, one-dimensional metal oxide nanorods, as the additive, to a positive electrode composition including the sulfur-based active material, the binder, and the conductive filler.

19. The method as defined in claim 18, further comprising:
removing the precursor nanostructures and any liquid present after the hydrothermal synthesis from the closed system prior to annealing the precursor nanostructures; and
wherein annealing the precursor nanostructures occurs at a temperature ranging from about 350° C. to about 700° C. for a time ranging from about 3 hours to about 5 hours, thereby vaporizing the water to form the porous, one-dimensional metal oxide nanorods.

20. The method as defined in claim 15 wherein the porous, one-dimensional metal oxide nanorods include a metal oxide selected from the group consisting of TiO$_2$, Al$_2$O$_3$, ZrO$_2$, and a combination thereof.

* * * * *